Oct. 27, 1970  A. SCHMITT  3,536,883
METHOD AND DEVICE FOR THE ELECTRICAL RESISTANCE SEAM WELDING
OF SURFACE-REFINED SHEET STEELS, MORE PARTICULARLY
OF HOT-GALVANIZED SHEET STEELS
Filed April 5, 1967  4 Sheets-Sheet 3

INVENTOR
ALBERT SCHMITT
BY
Woodhams, Blanchard & Flynn
ATTORNEYS

Oct. 27, 1970   A. SCHMITT   3,536,883
METHOD AND DEVICE FOR THE ELECTRICAL RESISTANCE SEAM WELDING
OF SURFACE-REFINED SHEET STEELS, MORE PARTICULARLY
OF HOT-GALVANIZED SHEET STEELS
Filed April 5, 1967   4 Sheets-Sheet 4

INVENTOR
ALBERT SCHMITT
BY
Woodhams, Blanchard and Flynn
ATTORNEYS

United States Patent Office 3,536,883
Patented Oct. 27, 1970

3,536,883
METHOD AND DEVICE FOR THE ELECTRICAL RESISTANCE SEAM WELDING OF SURFACE-REFINED SHEET STEELS, MORE PARTICULARLY OF HOT-GALVANIZED SHEET STEELS
Albert Schmitt, Munich-Obermenzing, Germany; Elisabeth Huber (nee Schmitt), heir to said Schmitt, deceased, assignor to Peco Elektrische Schweissmaschinenfabrik Rudolf Bocks, Munich-Pasing, Germany
Filed Apr. 5, 1967, Ser. No. 628,740
Claims priority, application Germany, Apr. 23, 1966, P 39,271
Int. Cl. B23k *11/06*
U.S. Cl. 219—81                            7 Claims

ABSTRACT OF THE DISCLOSURE

A method and apparatus for electrical resistance seam welding of surface-refined sheet steels wherein metal strips of unrefined steel are positioned between the electrode rollers and the surface-refined steel sheets so that when the electrodes are moved into contact with the unrefined metal strips and electrical power applied thereto, the vapors and oxides resulting from welding the surface-refined steel sheets together will not collect on the electrodes which thus prolongs the time which welding may be carried on at lower electrical output.

FIELD OF THE INVENTION

This invention relates to a method and apparatus for electrical resistance seam welding of surface-refined sheet steel, more particularly of hot-galvanized sheet steel.

BACKGROUND OF THE INVENTION

The seam bonding of galvanized, especially hot-galvanized sheet metals by means of electrical resistance welding has resulted in considerable difficulties for the reason that the heat developing at the welding area during the welding operation causes the zinc-coating on the welding material to become liquified and gaseous so that the material thus settles on the electrode rollers of the resistance welding apparatus. Such surface impurity soon prohibits further seam welding in view of the fact that deposits of zinc or zinc oxides on the electrode rollers increases. A further drawback is that the electrical resistance welding of galvanized sheet metals as compared with the welding of equivalent but ungalvanized sheet metals requires a considerably higher electrical output, approximately 50 percent higher.

The present invention is primarily intended to provide a method and apparatus for the electrical resistance seam welding of surface-refined sheet metals, more particularly of hot-galvanized sheet steels, and to permit the simplest possible and most economical welding of such metal sheets.

This invention accomplishes this objective by feeding a weldable metal strip with non-refined surfaces between the electrode rollers of the seam welding apparatus and the refined surfaces of the metal plates facing the electrode rollers, and by conducting during the welding operation water under pressure or air under pressure to the contact points of the electrode rollers with the metal strips. In the fusing of surface-refined material, its vapors such as zinc vapors or the like area thus flushed away from the welding area by the force of the air or the water.

According to a further feature of the invention, the metal strip to be welded is a strip of steel or rust-proof steel.

The apparatus for putting into effect such method according to the invention comprises guide-channels as are known per se in the art guiding the sheet strips near the welding point, conduits for the air or the water under pressure being disposed adjacent each contact point of an electrode roller with the metal strips to be welded.

According to a still further feature of the invention the welding metal strip is narrower than the contact surface of the electrode roller exerting the welding pressure.

Further features of the invention will become apparent from the following description of the illustrative embodiment set forth in the attached drawings.

DETAILED DESCRIPTION

Figure 1:
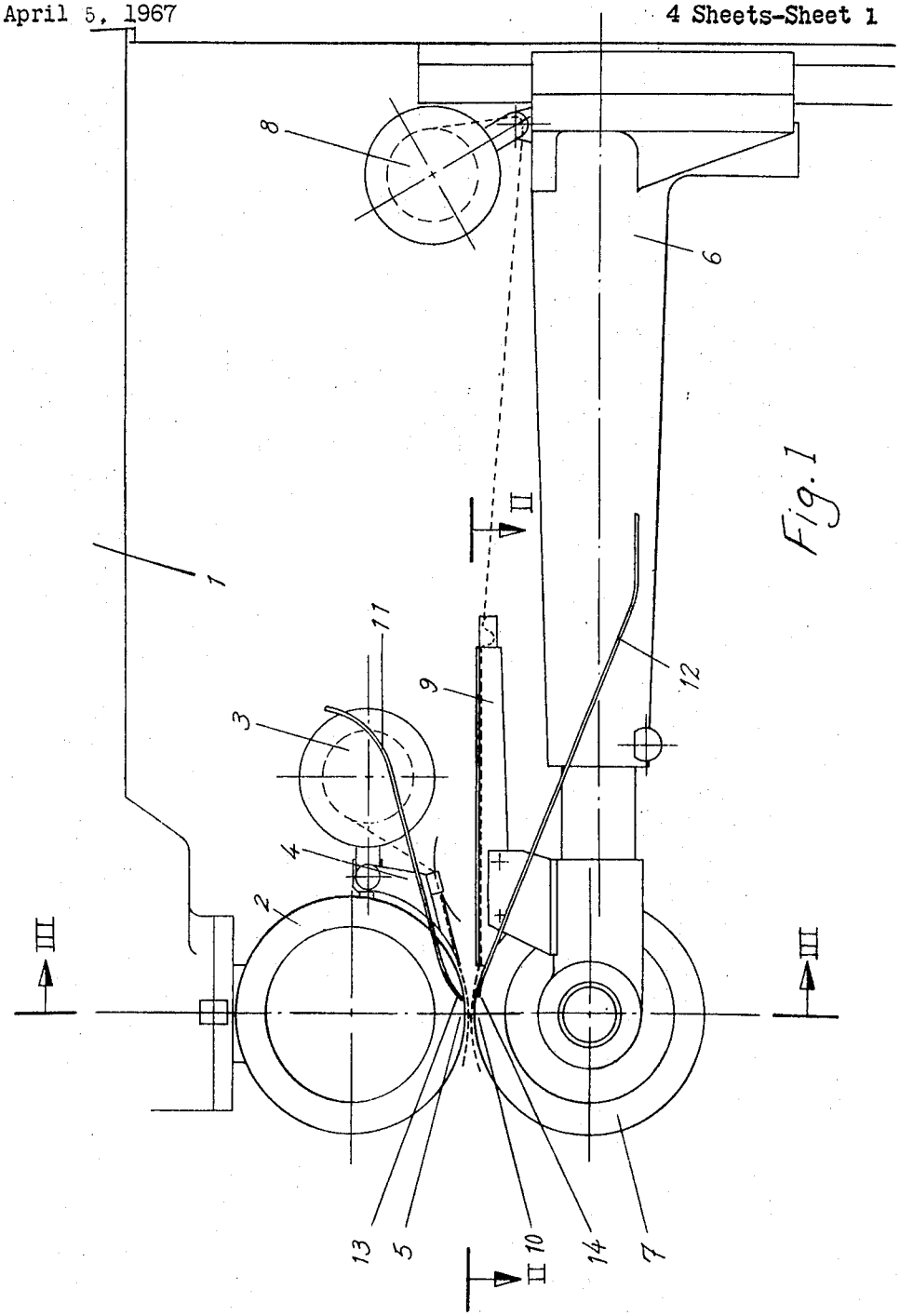
FIG. 1 is a schematic partial side view of an electrical seam welding apparatus according to the invention.
Figure 2:
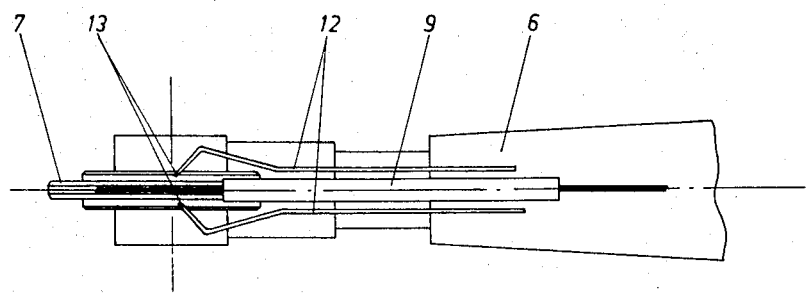
FIG. 2 is a section taken along line II—II of FIG. 1.
Figure 3:
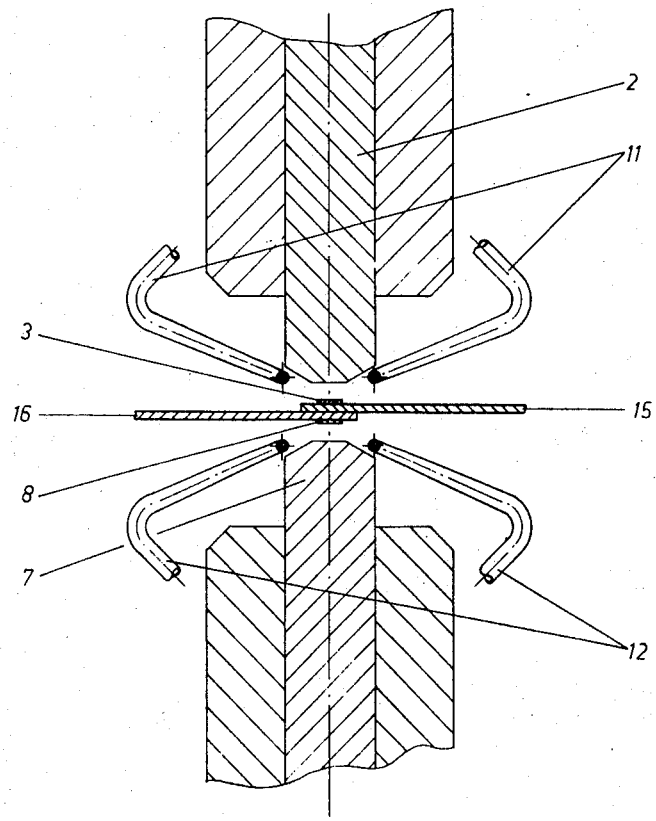
FIG. 3 is a section taken along line III—III of FIG. 1.
Figure 4:
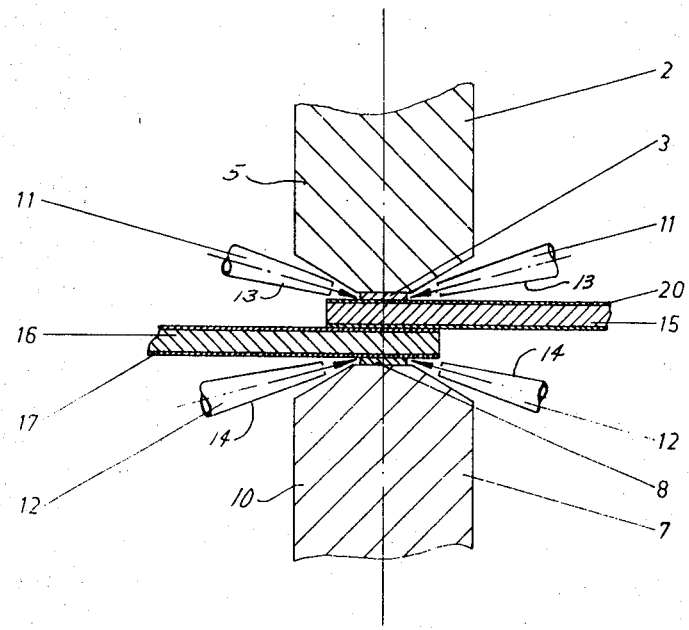
FIG. 4 is an enlarged section of a portion of FIG. 3.

The electrical seam welding apparatus comprises an upper arm 1 carrying at its free end the electrode roller 2. Adjacent said electrode roller 2 there is disposed a roll 3 of a wound up metal strip having non-refined surfaces, preferably an ungalvanized sheet steel strip which is to be guided near the welding contact 5 of the electrode roller 2 by means of a quite common guide device 4. The lower arm 6 of the electrical seam welding apparatus supports the lower electrode roller 7, a metal strip, by preference an ungalvanized sheet steel strip, being guided from the roll 8 over the guide arrangement 9 near to the welding contact 10 of the electrode roller 7. Conduits 11, 12 provide for air under pressure or water under pressure, preferably in pairs are associated with either electrode rollers 2 and 7, the jet of air or water being fed laterally to the electrode contact 5 and 10 from the nozzle-like outlets 13 and 14 of said conduits. As is shown in connection with FIG. 4, the sheet steels 15 and 16 to be welded have surface-refined zinc coatings 20 and 17. The ungalvanized steel strips 3 and 8 are preferably narrower than the contact width of the electrode rollers 2 and 7.

By exerting the welding pressure to be applied by the electrode rollers after connection of the welding current, the ungalvanized steel strips 3 and 8 and the bilaterally galvanized sheet steels 15 and 16 are heated. The heating by the welding current and application of welding pressure leads to a metallurgical fusion of the materials. With contact surfaces of the electrode rollers 2 and 7 abutting only an ungalvanized surface of the steel strips 3 and 8 to be welded. The risk of the contact surfaces being contaminated is largely eliminated. The risk of alloying the electrode rollers with zinc or zinc oxides owing to vaporization of the zinc coatings of the sheet steels to be welded is further precluded by the jet of water or air fed from the nozzles 13 and 14, such jet being directed on the spots where liquid zinc as well as zinc vapors and zinc oxides are originating.

As has been described hereintofore, the breadth of the ungalvanized steel strips 3 and 8 is always narrower than the width of the contact surface of the electrode rollers. In cases where the latter are of the order of 10 mm. and above, an ungalvanized steel strip of approximately 4 to 6 mm. with a thickness of 0.3 to 0.5 mm. will be sufficient. For the seam welding of a body to be formed of galvanized sheet metal, e.g. of a fuel tank for an automobile, where rust protection must also be fully maintained at the seam weld, the metal strip to be selected must be one of rust-proof steel.

Though the present method and the described device for carrying out said method are set forth as an illustration of the seam welding of galvanized sheet metals, it goes without saying that sheet metals with a surface coating which causes the same difficulties as hot-galvanized sheet metals do, may equally be welded in like manner.

Although a particular preferred embodiment of the invention has been disclosed above in detail for illustrative purposes, it will be recognized that variations or modifications of such disclose, which come within the scope of the appended claims, are fully contemplated.

The embodiments of the invention in which an exclusive property or privilege is claimed are defined as follows:

1. In an electrode protective apparatus for use with a resistance welder for galvanized sheet steel, such welder including a frame and opposed roller electrodes between which a pair of galvanized steel sheets are received for welding together, the combination comprising:
   means shielding each roller electrode from said galvanized sheets for preventing said roller electrode from directly contacting the heated zinc coating on said sheets during welding, said means comprising ferrous strips, one such strip being interposed between each roller electrode and the face of the opposed one of said galvanized sheets;
   means for supplying continuous length of said ferrous strips during welding;
   means for preventing contact of said zinc and zinc oxide vapor with said electrodes comprising a fluid and means directing same forceably at the welding zone during welding.

2. The apparatus defined in claim 1, wherein said fluid is air.

3. The apparatus defined in claim 1, wherein said fluid is water.

4. The apparatus defined in claim 1, wherein said electrode roller means have a width defining a pressure applying surface; and
   wherein said ferrous metal strips are narrower than said width of said pressure applying surface on said electrode roller means.

5. The apparatus defined in claim 1 wherein said ferrous strips are located in the welding zone so as to each contact only a respective one of the galvanized sheets whereby weld current can flow between the roller electrodes only by passing through both ferrous strips and both galvanized sheets to be welded.

6. The apparatus defined in claim 1, wherein said fluid directing means includes a pair of conduits supported on opposite sides of said galvanized sheets, said conduits having nozzles directed at said welding zone to direct said fluid to the source of said zinc vapors at said welding zone to flush said zinc vapors away and thereby prevent contamination of said electrode rollers.

7. The apparatus defined in claim 1, wherein said electrode rollers are radially aligned; and
   wherein said galvanized sheets are overlapped and the overlapped portion thereof is received between said electrode rollers, said electrode rollers being aligned with the overlapped portion, said ferrous strips engaging the opposite sides of said overlapped portion and are positioned between said electrode roller and said opposite sides of said overlapped portion.

References Cited

UNITED STATES PATENTS

| | | | |
|---|---|---|---|
| 2,409,636 | 10/1946 | Little | 219—101 |
| 3,383,489 | 5/1968 | Ciranko | 219—81 |

FOREIGN PATENTS

| | | |
|---|---|---|
| 918,650 | 8/1954 | Germany. |

JOSEPH V. TRUHE, Primary Examiner

L. R. ROUSE, Assistant Examiner